United States Patent
Heitz

(10) Patent No.: US 9,013,978 B2
(45) Date of Patent: Apr. 21, 2015

(54) SYNCHRONIZATION BETWEEN ACTIVE TCP APPLICATION AND STANDBY TCP APPLICATION

(71) Applicant: Telefonaktiebolaget L M Ericsson (publ), Stockholm (SE)

(72) Inventor: Jakob Heitz, Santa Clara, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/085,050

(22) Filed: Nov. 20, 2013

(65) Prior Publication Data

US 2014/0082043 A1    Mar. 20, 2014

Related U.S. Application Data

(63) Continuation of application No. 13/103,984, filed on May 9, 2011, now Pat. No. 8,614,941.

(51) Int. Cl.
| | |
|---|---|
| *H04L 12/26* | (2006.01) |
| *H04L 29/08* | (2006.01) |
| *H04L 12/775* | (2013.01) |
| *H04L 12/751* | (2013.01) |
| *H04L 29/06* | (2006.01) |
| *H04L 29/14* | (2006.01) |

(52) U.S. Cl.
CPC .......... *H04L 67/1095* (2013.01); *H04L 45/583* (2013.01); *H04L 45/02* (2013.01); *H04L 69/16* (2013.01); *H04L 69/40* (2013.01)

(58) Field of Classification Search
USPC .................................................. 370/216–228
See application file for complete search history.

(56) References Cited

U.S. PATENT DOCUMENTS

| 7,787,365 | B1 * | 8/2010 | Marques et al. ............. 370/220 |
| 7,940,650 | B1 | 5/2011 | Sandhir et al. |
| 2004/0078625 | A1 | 4/2004 | Rampuria et al. |
| 2004/0090913 | A1 | 5/2004 | Scudder et al. |
| 2005/0078600 | A1 * | 4/2005 | Rusmisel et al. ............ 370/217 |
| 2005/0213498 | A1 * | 9/2005 | Appanna et al. ............. 370/216 |

(Continued)

OTHER PUBLICATIONS

Non-Final Office Action, U.S. Appl. No. 13/103,984, Jan. 14, 2013, 18 pages.

(Continued)

*Primary Examiner* — Otis L Thompson, Jr.
(74) *Attorney, Agent, or Firm* — Blakely Sokoloff Taylor & Zafman LLP

(57) ABSTRACT

Embodiments of the invention include a method for maintaining an active-standby relationship between an active control card and a standby control card in a network element. The network element receives a data from a remote peer at the active control card. The network element communicates data from the active TCP module to an active application module in the active control card. The network element communicates synchronization data from the active application module to a standby application module on the standby control card. The network element communicates a single application synchronization acknowledgement from the standby application module to the active APP module. The network element communicates an application acknowledgment packet from the active application module to the active TCP module responsive to receiving the application synchronization acknowledgment. The network element then communicates an acknowledgement to the remote peer responsive to the application acknowledgement.

14 Claims, 6 Drawing Sheets

(56) References Cited

U.S. PATENT DOCUMENTS

| | | |
|---|---|---|
| 2005/0265346 A1* | 12/2005 | Ho et al. .................... 370/392 |
| 2006/0062142 A1 | 3/2006 | Appanna et al. |
| 2007/0180311 A1 | 8/2007 | Harvey et al. |
| 2008/0159325 A1 | 7/2008 | Chen et al. |
| 2008/0163248 A1 | 7/2008 | Chen |
| 2009/0129261 A1 | 5/2009 | Visser et al. |
| 2009/0219805 A1 | 9/2009 | Appanna et al. |
| 2010/0296516 A1 | 11/2010 | Ramaiah et al. |
| 2012/0042205 A1 | 2/2012 | Chen |

OTHER PUBLICATIONS

Notice of Allowance, U.S. Appl. No. 13/103,984, Sep. 20, 2013, 9 pages.

Final Office Action, U.S. Appl. No. 13/103,984, Jun. 11, 2013, 19 pages.

* cited by examiner

SYNCHRONIZATION BETWEEN ACTIVE TCP APPLICATION AND STANDBY TCP APPLICATION

CROSS-REFERENCE TO RELATED APPLICATION

This application is a continuation of U.S. patent application Ser. No. 13/103,984, filed on May 9, 2011, which is hereby incorporated by reference.

FIELD

Embodiments of the invention relate generally to the field of active-standby systems in network elements and relate more particularly to hitless switchovers in active-standby systems in network elements.

BACKGROUND

Transmission Control Protocol (TCP) is a reliable transport protocol described in various literature such as Internet Engineering Task Force (IETF) Request for Comments (RFC) 793, "DARPA Internet Program Protocol Specification," September 1981, and IETF RFC 1122, "Requirements for Internet Host—Communication Layers," October 1989. An application program on a computer uses TCP to send and receive data with another application program located on a remote computer. TCP uses Internet Protocol (IP) to send data in packets to its destination. IP will deliver the packets to the correct destination along a path of its own choosing. IP may fail to deliver a small number of packets or it may deliver a small number of them in a different order than in which they were sent. TCP assigns a sequence number to every byte of data that it sends. The receiving TCP can use the sequence numbers to reorder the received data to deliver them to the application program on the receiving computer in the same order that they were sent. The receiving TCP also uses the sequence numbers to detect missing data and cause the sender TCP to retransmit them. As a TCP receiver receives data, it will occasionally send an acknowledgement back to the TCP sender. The acknowledgement contains a sequence number. This indicates that the receiver has successfully received all sequenced data up to the acknowledged sequence number. The TCP receiver will then deliver the received data to its application process. In response to receiving the acknowledgement, the TCP sender will remove the acknowledged data from its retransmission list. The retransmission list is a temporary storage for transmitted data on the TCP sender. As the application process asks TCP to send data, the sending TCP simultaneously puts that data onto its retransmission list. At certain times as specified in various RFCs, if the TCP sender does not receive acknowledgement for sent data, it will retransmit the data on the retransmission list. In this way, even if IP loses some data, TCP can recover it.

One way to achieve high reliability of computer application programs is to use the active-standby method. A single standby/active computer system can be built with two fully functional computers. One functional computer is termed the active computer and the other is termed the standby computer. The active computer works as normal and the standby computer waits to take over operations when and if the active computer fails. The activity when the standby takes over is termed a switchover. On switchover, the standby computer becomes the active computer. The old active computer is no longer functioning in the standby/active computer system. The old active computer may rejoin the standby/active computer system at a later time, such as after repair or reset. The old active computer may rejoin the standby/active computer system, either taking back the active computer role or taking the standby computer role.

If the standby computer can switchover without causing disruption, the switchover is termed a hitless switchover. In this case, other computer systems that interact with the standby/active computer system view this redundant computer system as a single computer and do not detect the failure or the switchover event. As such, the failure can be repaired without impacting the interaction of the standby/active computer with other computers. For the switchover to be hitless, the standby computer must communicate with the active computer to track the progress of the active computer and save all essential data as it is created on the active computer.

At the point of failure, the standby computer may not have all data from the active computer, because communication between active computer and standby computer may have failed before all data could be sent from the active computer to the standby computer. In this case, the standby computer must recover the lost data for the switchover to be hitless.

There are methods for the TCP process to achieve a hitless switchover. However, those methods ignore the application process that uses TCP. A method will send incoming TCP data from the active TCP process to the standby TCP process before sending the acknowledgement to the remote TCP peer. The active TCP will pass the received data to the active application. Then the application will process it and possibly send some updated state to its standby application to synchronize the updated state. The standby application will also receive the same data from the standby TCP and update its own state. The application process is typically processing inputs that come from sources other than the TCP connection. With the existing solution, it is complex and error prone to keep the processing of other inputs and the TCP inputs synchronized between the active computer and the standby computer.

Concerning TCP output data, in an existing solution, the active TCP will send outgoing data to the standby TCP before sending it out to the remote TCP peer. This allows the standby TCP to retransmit the outgoing data it in the event of a switchover and then a failed transmission. However, it is complex and error prone for the standby application to know exactly what the active application has and has not sent at the time of a switchover. Some applications are able to retransmit outgoing data at the application level without causing disruption of the application. Some, such as file transfer protocol (FTP) or an echo server cannot retransmit application data that has been successfully transmitted without causing disruptions of the application. Even when an application can afford to retransmit some data on switchover, it is difficult for it to know how much data to retransmit safely.

Therefore, it is desirable to provide a mechanism for TCP and the application program to interact in a manner to simplify hitless switchover by allowing the standby application to more accurately track the status of the active application and incoming/outgoing TCP transmissions.

SUMMARY

Embodiments of the invention include a method performed in a network element for maintaining an active-standby relationship between an active control card and a standby control card. The network element receives a data packet from a remote network element at an active transmission control protocol ("TCP") module in the active control card. The network element communicates at least a portion of the data packet from the active TCP module to an active application ("APP") module in the active control card. The network element communicates an APP synchronization ("SYNC") message from the active APP module to a standby APP module on the standby control card responsive to receiving the at least a portion of the data packet. The network element communicates an APP SYNC acknowledgement ("ACK") message from the standby APP module to the active APP module, wherein the APP SYNC ACK message indicates successful delivery of the APP SYNC message. The network element communicates an APP ACK message from the active APP module to the active TCP module responsive to receiving the APP SYNC ACK message. The network element communicates a data ACK message from the active TCP module to the remote network element responsive to receiving the APP ACK message, wherein the ACK message indicates successful delivery of the data packet.

Embodiments of the invention include a first control card to be coupled to a second control card, the first control card to serve as an active control card in an active-standby relationship with the second control card. The first control card includes an active transmission control protocol ("TCP") module to be coupled to one or more line cards. The active TCP module is configured to receive a data packet from a remote network element, communicate at least a portion of the data packet to an active application ("APP") module, receive an APP acknowledgement ("ACK") message, and communicate a data ACK message to the remote network element in response to the receipt of the APP ACK message. The active APP module is to be coupled to the active TCP module and is to be further coupled to a standby APP module on the second control card. The active APP module is configured to receive the at least a portion of the data packet from the active TCP module, communicate an APP synchronization ("SYNC") message to the standby APP module, receive an APP SYNC ACK message from the standby APP module, and communicate an APP ACK message to the active TCP module in response to receipt of the APP SYNC ACK message.

Embodiments of the invention include a network element to perform a hitless switchover in the event of a fault. The network element comprises a plurality of line cards to be coupled to a network, a first control card coupled to the plurality of line cards, and a second control card coupled to the plurality of line cards. The first control card to serve as an active control card in an active-standby relationship. The first control card comprising an active transmission control protocol ("TCP") module configured to receive a data packet from a remote network element through one of the plurality of line cards, communicate at least a portion of the data packet to an active application ("APP") module, receive an APP acknowledgement ("ACK") message, and communicate a data ACK message to the remote network element through one of the plurality of line cards in response to the receipt of the APP ACK message. The first control card further comprising an active APP module to be coupled to the active TCP module and to be further coupled to a standby APP module on a second control card. The active APP module configured to receive the at least a portion of the data packet from the active TCP module, communicate an APP synchronization ("SYNC") message to the standby APP module, receive an APP SYNC ACK message from the standby APP module, and communicate an APP ACK message to the active TCP module in response to receipt of the APP SYNC ACK message. The second control card coupled to the plurality of line cards and to the first control card. The second control card to serve as a standby control card in the active-standby relationship with the first control card. The second control card compris- ing a standby TCP module to be coupled to a standby APP module. The standby TCP module configured to communicate with the plurality of line cards, and communicate with the standby APP module. The standby application module configured to receive the APP SYNC message from the active APP module, transmit the APP SYNC ACK message to the active APP module to indicate receipt of the APP SYNC message.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The invention may best be understood by referring to the following description and accompanying drawings that are used to illustrate embodiments of the invention. In the drawings.

DETAILED DESCRIPTION

Figure 1A:
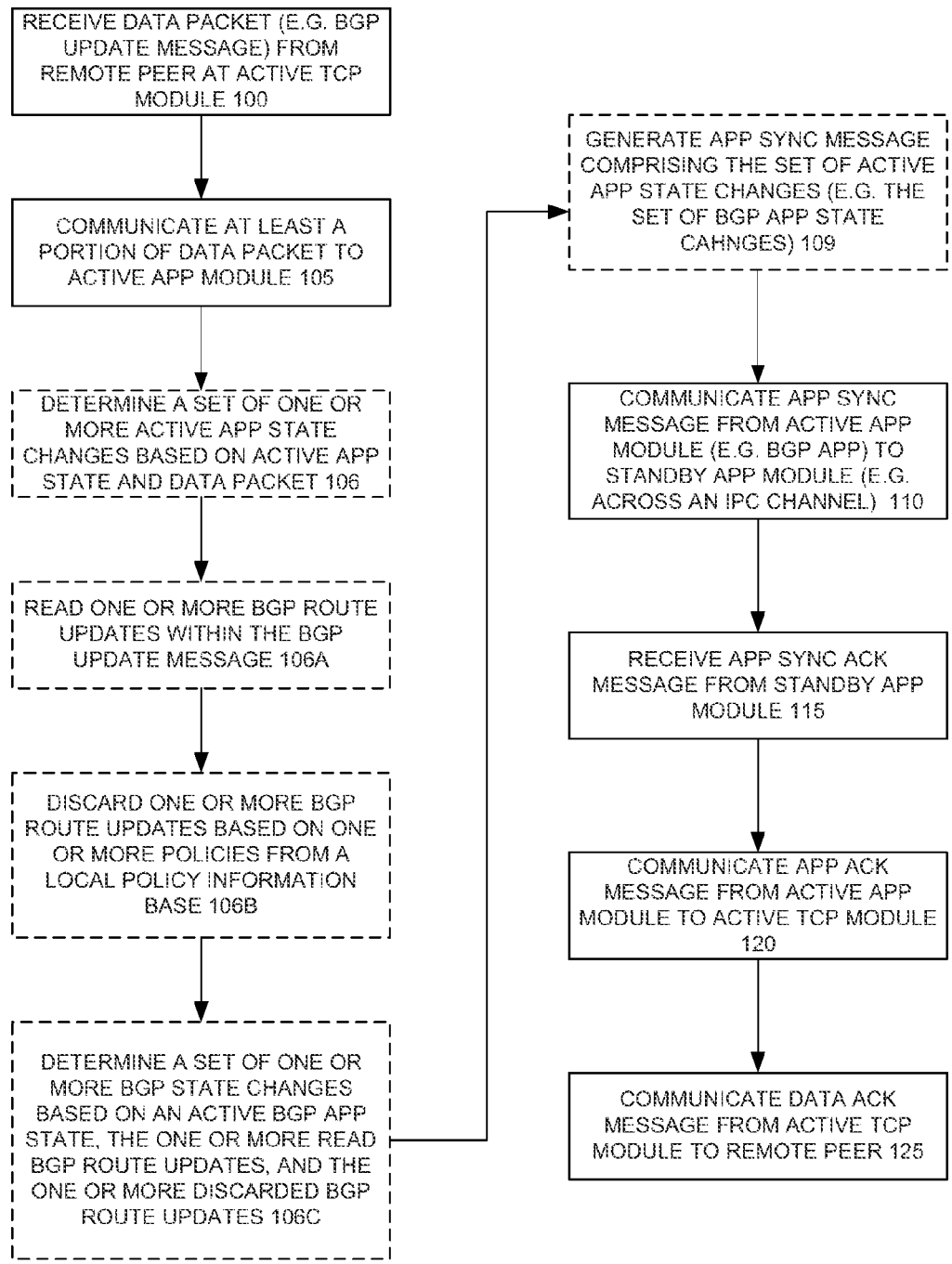
FIG. 1A is a flow chart illustrating a method for synchronizing data that is received at an active application with a standby application according to embodiments of the invention.

The following description describes methods and apparatus for an active/standby computer system that performs a hitless switchover of TCP connections when the standby system transitions to an active mode. In the following description, numerous specific details such as logic implementations, opposed, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

To ease understanding, dashed lines have been used in the figures to signify the optional nature of certain items (e.g., features not supported by a given implementation of the invention; features supported by a given implementation, but used in some situations and not in others).

Embodiments of the invention disclose an application program that uses TCP on an active/standby computer system and preserves TCP connections with remote peers in response to planned or unplanned switchovers. An unplanned switchover occurs when the active computer crashes or otherwise stops functioning and the standby computer takes over. The application program is using a TCP endpoint to communicate with a remote TCP peer. Because the switchover is unexpected, it is not possible for the standby computer to know the precise state that the active computer reached prior to switchover. The active application process will synchronize its state to the standby application process during normal operation, so that the standby application process will know most of the state before a switchover, but may not know all of it.

In addition to preserving the TCP connections, this also provides the application the opportunity to synchronize inputs from several TCP remote peers as well as inputs from other sources (e.g. user input from keyboard, mouse, touchscreen; external monitors; I/O devices such as CD-ROM, hard disk) and ensure that the standby application can receive the inputs in the same order as the active application. In some applications, the precise order of inputs from different sources produces different output.

An example where the order in which inputs from different sources produces different output is as follows. Suppose a Border Gateway Protocol (BGP), as described in IETF RFC 4271, "A Border Gateway Protocol 4 (BGP-4)," January 2006, application receives a route from an external BGP peer. It will re-advertise that route to all its internal BGP peers. If the BGP application subsequently receives a better route from an internal BGP peer, it will withdraw its first route from its internal BGP peers. If the BGP application were to receive those two advertisements in the other order, it would not send any advertisement, because its internal BGP peer already advertised a better route than the external BGP peer advertised. If the standby BGP application were to receive the routes in an order other than the order received by the active BGP application, than the standby BGP application may determine the course of action to take upon switchover erroneously (e.g. a route needed to be advertised, a route needed to be withdrawn, or no action was required). In the case where a route is received from an external BGP peer and then a better route is received from an internal BGP peer, if the standby BGP application were to receive the advertisements in reverse order and a switchover were to occur before the active BGP application sent the withdrawal, then the standby would never know to send a withdrawal.

In order to provide an embodiment in which the standby application receives inputs in the same order as the active application, the TCP process on the active computer does not synchronize data with the TCP process on the standby computer. This has the advantage of saving bandwidth and CPU cycles. Instead the TCP process on the active computer synchronizes its data with the active application process and the active application process synchronizes enough data between active application process and standby application process to precisely reconstruct the TCP state as well as its own state. In response to a switchover, the standby computer will create one or more TCP connections in the established states and supply the TCP process with data to retransmit and sequence numbers to ensure a smooth transition of the TCP connections. The new connections will not exchange TCP SYN segments with the corresponding TCP remote peers as new TCP connections normally do, since switchover will be transparent to the corresponding remote peers.

FIG. 1A is a flow chart illustrating a method for synchronizing data that is received at an active application with a standby application according to embodiments of the invention. In one embodiment, the method of FIG. 1A is performed within a network element with an active computer and a standby computer, while in other embodiments the method is performed by a general computer system with an active computer and a standby computer. The active computer and the standby computer correspond to an active control card and a standby control card within the network element. In yet another embodiment, the active application and standby application may reside within a single computer with a set of isolated resources dedicated to the active application and a set of isolated resources dedicated to the standby application. This may be the case when the active application resides within a first virtual machine on the computer and the standby application resides within a second virtual machine on the computer; in this scenario the first virtual machine is the active computer and the second computer is the standby computer.

FIG. 1A begins at block 100 with an active TCP module receiving a data packet from a remote peer. For example, in the case where the active application is a BGP router application and the remote peer is a BGP router, the data packet may comprise a BGP update message. The method continues at block 105 with the active TCP module communicating at least a portion of the data packet to an active application (APP) module. The active TCP module communicates the data packet to the active APP module.

Optionally, the method may continue to the dashed block 106 and determine a set of one or more active APP state changes that must occur based on the current active APP state and the received data packet. In the example of the active application being a BGP router and the data packet being a BGP update message, the method continues to dashed block 106A and reads one or more BGP route updates within the BGP update message. The method continues to dashed block 106B and discard one or more BGP route updates based on one or more policies from a local policy information base. The method then determines a set of one or more BGP route state changes based on an active BGP APP state, the one or more read BGP route updates, and the one or more discard BGP route updates. The method then continues to dashed block 109 and generates an APP SYNC message comprising the set of active APP state changes such as the set of BGP APP state changes.

The method continues at block 110 with the active APP module communicating an APP synchronization (SYNC) message to the standby APP module on the standby computer. In one embodiment, the APP SYNC message comprises all of the data from the data packet received by the active TCP module. In another embodiment, the APP SYNC message comprises a compressed form of the data packet received by the active TCP module. In yet another embodiment, the APP SYNC message indicates a set of one or more application state changes that the active APP module determined were needed in response to the data packet. The compressed form comprises data determined by the active APP module to be sufficient for the standby APP module to react appropriately to the data packet received by the active TCP module and to reconstruct a response to the data packet. In either case, the APP SYNC message comprises the sequence number from the data packet received by the active TCP module such that the standby APP module is aware that the active APP module received that data packet. In this way, the standby APP module can detect and discard a duplicative data packet that is sent from the remote peer if that data packet was properly processed but the corresponding acknowledgement (ACK) packet from the active TCP module was never received by the remote peer. The active APP module and the standby APP module are coupled via an inter-process communication (IPC) channel that carries the application synchronization data. In one embodiment, the IPC channel is a set of shared memory space within a computer system. While the IPC channel in other embodiments include signals, pipes, sockets, switch fabric, and networking media (e.g., optical, ethernet, coaxial, radio). In yet other embodiments, the IPC channel is a combination of some or all of the IPC channels mentioned or include other implementations of IPC.

The method continues at block 115 with the active APP module receiving an APP SYNC ACK message from the standby APP module through the IPC channel. This message informs the active APP module that the standby APP module properly received the APP SYNC message. In response to receiving the APP SYNC ACK message, the active APP module communicates an APP ACK message to the active TCP module at block 120 that indicates that the data packet received by the active TCP module has been properly processed and that the active TCP module should respond to the remote peer with an ACK message. In response to receiving the APP ACK message, the active TCP module communicates a data ACK message to the remote peer at block 125, the data ACK message indicates that the active TCP module properly received the data packet sent by the remote peer.

Thus, when the active TCP module receives incoming data from a peer it does not automatically acknowledge the receipt of the data as normal. Instead, the active TCP module waits until the active APP module acknowledges the data to the active TCP module before sending an ACK to the remote peer. However, the nature of the data that the active APP module synchronizes to the standby APP module depends on the application. For example, a BGP application will not synchronize keep alive messages. For update messages, BGP may synchronize the routes contained within the message rather than the message itself. As it does that, it has the flexibility to add or remove information to the routes before it synchronizes them. It could add a preference or other attributes that were added by policy. Particularly useful is the ability not to synchronize routes that are discarded by incoming policy. This can save bandwidth and processing resources that may otherwise be needed to send the discarded routes to the standby APP module.

Even though the active APP module may not need to synchronize all received data to the standby APP module or it may synchronize some received data in a form other than that in which it was received, the active APP module does send the TCP sequence numbers or sufficient information to recreate the TCP sequence numbers. In one embodiment, the active APP module communicates the number of bytes received to the standby APP module instead of the sequence number. The standby APP module can use the initial sequence number and the number of bytes received to recreate the actual sequence number. In the event of a switchover, the new active APP module (formerly the standby APP module) will acknowledge the latest synchronized TCP sequence number to the remote peer. The formerly active APP module may have acknowledged any sequence number less than or equal to this one to the remote peer. The remote peer may have sent more than was acknowledged. If so, the remote peer will retransmit from last sent sequence number onwards. This way, the new active APP module can recover the incoming TCP data stream precisely.

Figure 1B:
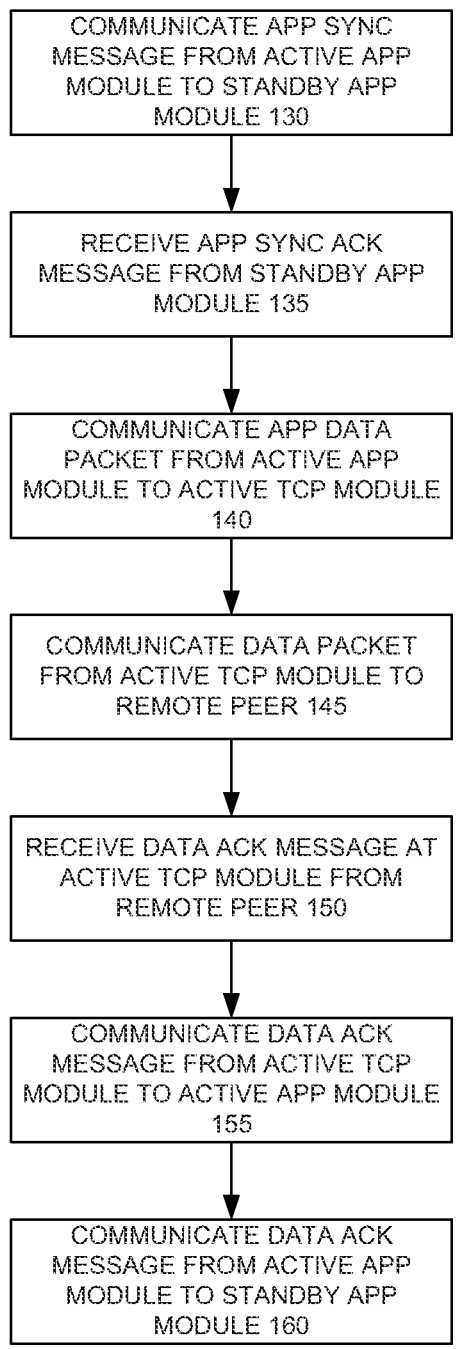
FIG. 1B is a flow chart illustrating a method for synchronizing data that is being sent from an active application to a remote peer with a standby application according to embodiments of the invention.

FIG. 1B is a flow chart illustrating a method for synchronizing data that is being sent from an active application to a remote peer with a standby application according to embodiments of the invention. As the active APP module sends data to the remote peer, the standby APP module must be prepared to retransmit that data in case the remote peer does not acknowledge receipt. In the event of a switchover, the standby APP module needs to retransmit the data.

In response to the active APP module generating data to send to a remote peer, the active APP module communicates an APP SYNC message to the standby APP module in block 130. The active APP module receives an APP SYNC ACK message from the standby APP module in block 135. The APP SYNC ACK message indicates that the standby APP module properly received the APP SYNC message. In response to receiving the APP SYNC ACK message, the active app module communicates an APP data packet corresponding to the generated data to the active TCP module in block 140. In response to receiving the APP data packet, the active TCP module communicates a data packet to the remote peer in block 145, the data packet corresponds to the APP data packet. The active TCP module receives a data ACK message from the remote peer in block 150 that indicates that the data packet was properly received at the remote peer. In one embodiment, the active TCP module communicates the data ACK message to the active APP module in block 155 in response to receiving the data ACK message. While in another embodiment, the active APP module retrieves the latest ACK sequence number from the active TCP module when the active APP module requires the number for synchronization. In response to the active APP module receiving the data ACK message from the active TCP module, the active APP module communicates the data ACK message to the standby APP module in block 160. In response to receiving the data ACK message, the standby APP module will then remove the acknowledged data from its retransmission list.

Not all active APP modules need to synchronize the generated output with a correspond standby APP module. For example, if the active computer and standby computer were to run an echo server application, then the active APP module does not need to send generated output to the standby APP module. The generated output is, after all, equal to the input. As long as the active APP module has synchronized the received data packet then the standby APP module can regenerate the output.

However, the active APP module does need to synchronize TCP sequence numbers or enough information to recreate them with the standby APP module. In the event of a switchover, the new active APP module (the former standby APP module) will retransmit any unacknowledged data packets with the correct sequence numbers. The remote peer may have already received some of this data from the former active APP module. In that case, it can detect the overlapping data from the TCP sequence numbers and precisely recreate the data stream.

Thus, the active APP module still synchronizes enough information for the standby APP module to recognize when to regenerate an output and resend a packet to the remote peer or to recognize when the remote peer has received the data packet and remove the acknowledged data from its retransmission list.

Figure 1C:
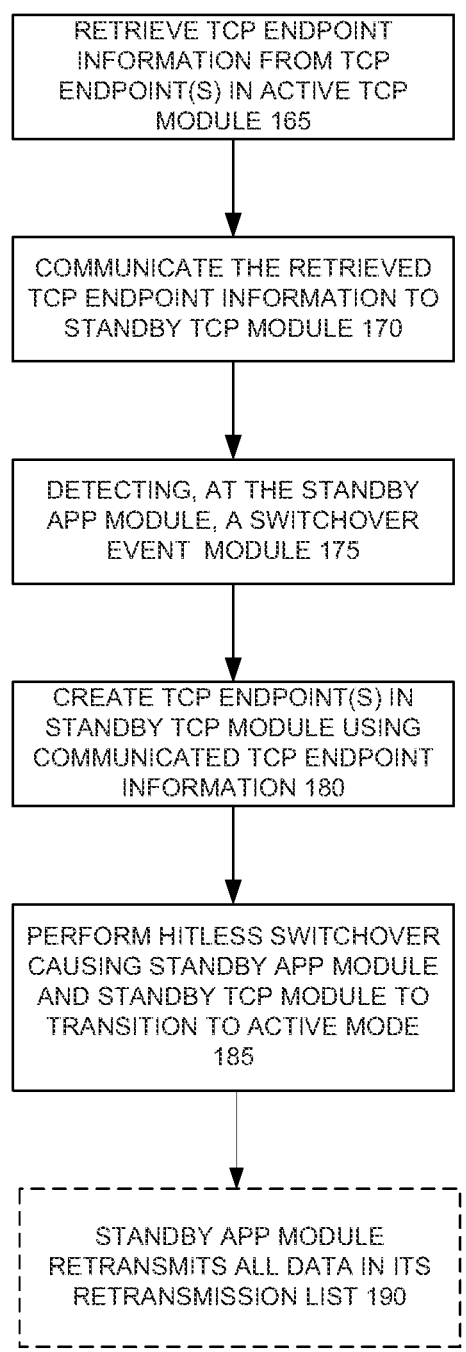
FIG. 1C is a flow chart illustrating a method for performing a hitless switchover from the active application of FIG. 1A and FIG. 1B to the standby application of FIG. 1A and FIG. 1B according to embodiments of the invention.

FIG. 1C is a flow chart illustrating a method for performing a hitless switchover from the active application of FIG. 1A and FIG. 1B to the standby application of FIG. 1A and FIG. 1B according to embodiments of the invention. The method begins at block 165 with the active APP module retrieving TCP endpoint information from a set of one or more TCP endpoints in the active TCP module. When a TCP connection is created between the active TCP module and the remote host, several TCP variables are negotiated. For example, initial sequence numbers, maximum segment sizes, window scaling and other TCP options. These are called static variables. Some TCP variables are dynamic variables. For example, the congestion window changes in response to exhibited network behavior during communication between the active TCP module and the remote peer. In one embodiment, the TCP endpoint information comprises the static variables, while in other embodiments the TCP endpoint information comprises the static variables and the dynamic variables. In yet another embodiment, the TCP endpoint information comprises a subset of the static variables and the dynamic variables in which the subset contains enough variables to allow the standby TCP module to recreate the TCP endpoint. Therefore, the standby TCP module uses the TCP endpoint information to recreate the TCP endpoint when needed because of a switchover.

The method continues at block 170 with the active APP module communicating the retrieved TCP endpoint information to the standby APP module. At time later, the standby APP module detects a switchover event that is causing the active APP module to exit an active state such that it is desired for the standby APP module to enter an active state at block 175. Examples of switchover events include, but are not limited to, hardware failures, software failures, software updates, planned outages, scheduled maintenance, improper configuration, and network medium failures. In one embodiment, the standby APP module periodically sends a heartbeat request to the active APP module and detects a degrading event in response to an unexpected heartbeat response or a lack of a heartbeat response. In another embodiment, the active APP module periodically sends status messages to the standby APP module and the standby APP module detects a degrading event in response to the contents of a status message or because of a lack of a status message.

In response to detecting a degrading event, the standby APP module determines that it should begin the transition from standby status to active status. At block 180, the standby APP module initiates creation of one or more TCP endpoints in the standby TCP module using the previously communicated TCP endpoint information. In other embodiments, the TCP endpoints are created in the standby TCP module prior to the standby APP module detecting the degrading events, this decreases the time required to perform a switchover. For example, the TCP endpoints may be created in the standby TCP module in response to receiving the TCP endpoint information. In this case, the standby TCP module will not handle traffic destined for the created TCP endpoints while in a standby mode since the active TCP module is responsible for handling that traffic.

In response to creating the TCP endpoints specified by the previously communicated TCP endpoint information, the method continues at block 185 by performing the hitless switchover. The hitless switchover causes the standby APP module and the standby TCP module to transition from a standby mode to an active mode. In one embodiment, the hitless switchover further causes the active APP module and the active TCP module to transition from an active mode to a standby mode when the switchover is planned and the newly active APP module begins synchronization with the newly standby APP module as described with reference to FIG. 1A. In another embodiment, the hitless switchover further causes the active APP module and the active TCP module to transition from an active mode to an inactive mode when the switchover is planned and no synchronization occurs between the newly active APP module and the inactive APP module.

Figure 2:
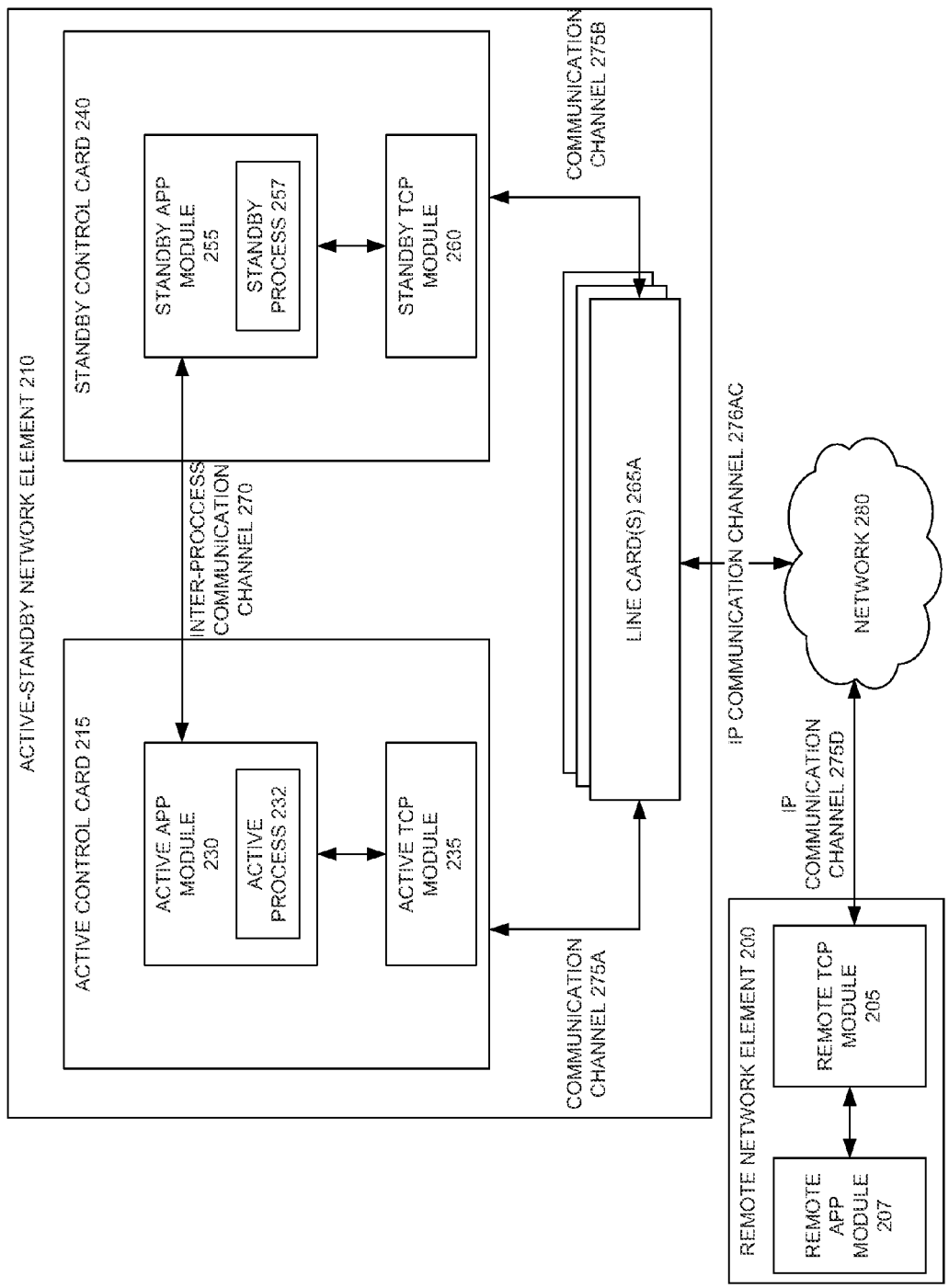
FIG. 2 is a block diagram illustrating an active-standby network element for providing an active-standby APP-TCP system with hitless switchover coupled to a remote network element through a network.

FIG. 2 is a block diagram illustrating an active-standby network element for providing an active-standby APP-TCP system with hitless switchover coupled to a remote network element through a network.

As used herein, a network element (e.g., a router, switch, bridge) is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network elements to exchange routes and select those routes based on one or more routing metrics.

Routes and adjacencies are stored in one or more routing structures (e.g., Routing Information Base (RIB), Label Information Base (LIB), one or more adjacency structures) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

In one embodiment, a network element includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network elements through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway)). By way of example, a service card may be used to terminate IPsec tunnels and execute the attendant authentication and encryption algorithms. Alternative embodiments may use different network element architectures (e.g. where there is not separation of line cards and control cards).

FIG. 2 will be described with reference to the exemplary operations of FIGS. 1A, 1B, and 1C. However, it should be understood that the operations of FIGS. 1A, 1B, and 1C can be performed by embodiments other than those discussed with reference to FIG. 2. Furthermore, FIG. 3 can perform operations different than those described with reference to FIGS. 1A, 1B, and 1C.

FIG. 2 illustrates an active-standby network element 210. The active-standby network element 210 comprises an active control card 215, a standby control card 240, and a set of one or more line cards 265A-265N. The active control card 215 is coupled to the set of one or more line cards 265A-265N through a communication channel 275A and the standby control card 240 is coupled to the set of one or more line cards 265A-265N through a communication channel 275B.

The active control card 215 comprises an active APP module 230 coupled to an active TCP module 235. The standby control card 240 comprises a standby APP module 255 coupled to a standby TCP module 260. The active APP module 230 is coupled to the standby APP module 255 through an inter-process communication channel 270. The active APP module 230 runs an active process 232 while the standby APP module 255 runs a standby process 257. In one embodiment, the network element 210 is a BGP router running active and standby BGP APPs, while in another embodiment the network element is a Multiprotocol Label Switching (MPLS) router running active and standby LDP processes. In yet another embodiment, the network element is a broadband remote access server (BRAS) running active and standby Access Node Control Protocol (ANCP) processes. Those skilled in the art would recognize that embodiments of the invention are suitable for other active-standby applications particularly when the state of TCP transmissions is critical to the proper switchover from the active to the standby application. In one embodiment the active APP module 230, the active TCP module 235, the standby APP module 255, and the standby TCP module 260 are distinct hardware modules configured to perform the functions as described with reference to FIGS. 1A, 1B, and 1C. In another embodiment, the active APP module 230, the active TCP module 235, the standby APP module 255, and the standby TCP module 260 are software modules running within the active-standby network element 210. In yet another embodiment, the active APP module 230, the active TCP module 235, the standby APP module 255, and the standby TCP module 260 are comprised of both specialized hardware modules and software modules running within the active-standby network element 210.

One or more of the set of one or more line cards 265A-265N are coupled to a network 280 through a IP communication channel 276AC and the network 280 is coupled to a remote network element 200 through IP communication channel 275D. The remote network element 200 comprises a remote TCP module 205 coupled with a remote APP module 207. The remote APP module 207 runs a remote process corresponding to the active process 232.

Figure 3:
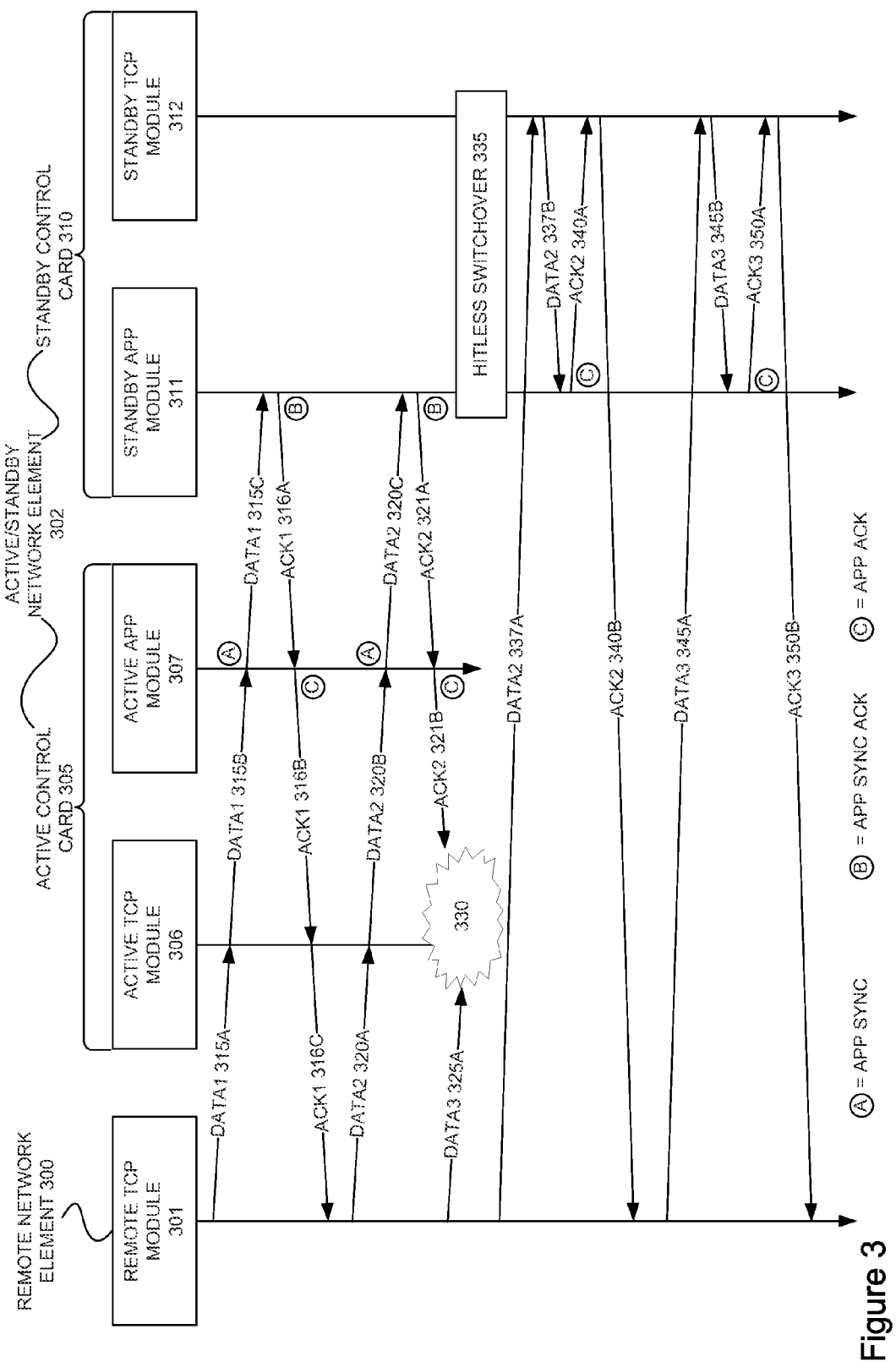
FIG. 3 is a data flow diagram illustrating the path of messages and acknowledgements for data received at a network element from a remote peer according to embodiments of the invention.

FIG. 3 is a data flow diagram illustrating the path of messages and acknowledgements for data received at a network element from a remote peer according to embodiments of the invention. FIG. 3 comprises a remote network element 300 and an active/standby network element 302. The remote network element 300 comprises a remote TCP module 301. The active/standby network element 302 comprises an active control card 305 and a standby control card 310. The active control card 305 comprises an active TCP module 306 and an active APP module 307. The standby control card 310 comprises a standby app module 311 and a standby TCP module 312. Each module is illustrated at the top of FIG. 3 with a vertical line illustrating the passage of time and lines traveling from one vertical line to another to illustrate the transmission of data at a moment of time.

Remote TCP module 301 starts off with communicating data packet 1 (DATA1) 315A to the active TCP module 306. In response to receiving application data, DATA1 315A, the active TCP module 306 communicates DATA1 315B to the active APP module 307. It is worth noting that the active TCP module does not send an ACK to the remote TCP module 301 at this time. In response to receiving DATA1 315B, the active APP module 307 sends DATA1 315C to the standby APP module 311. DATA1 315C is an APP SYNC message that is used by the active APP module 307 to synchronize the active APP module 307 with the standby APP module 311. The standby APP module 311 communicates an acknowledgement packet ACK1 316A to the active APP module 307. ACK1 is an APP SYNC ACK message used by the standby APP module to acknowledge receipt of the APP SYNC message. In response to receiving the APP SYNC ACK message, the active app module 307 communicates ACK1 316B, an APP ACK message, to the active TCP module 306. In response to receiving ACK1 316B, the active TCP module 306 communicates ACK1 316C to the remote TCP module 301. In this way, the acknowledgement from the active TCP module 306 to the remote TCP module 301 is not sent until the active APP module 307 is able to synchronize with the standby APP module 311 allowing for synchronization at both the APP level and the TCP level during the processing of DATA1 packet 315A FIG. 3 similarly shows remote TCP module 301 communicating data packet 2 (DATA2) 320A to the active TCP module 306 which in turn communicates DATA2 320B to the active APP module 307. The active APP module communicates DATA2 320C, an APP SYNC message, to the standby APP module 311 which responds with an ACK 2 (ACK2) 321A, an APP SYNC ACK, to the active APP module 307. The active APP module 307 responds to the active TCP module 306 with ACK2 321B, an APP ACK; however, the active TCP module 306 does not receive ACK2 321B because a switchover event 330 occurs before receipt. Further, remote TCP module 301 communicates data packet 3 (DATA3) 325A prior to the degrading event 330. However, after remote TCP module 301 transmits DATA3 3325A and before the ACTIVE TCP module 306 receives DATA3, the degrading event occurs. In response to detecting that a switchover event, the standby control card 310 performs a hitless switchover 335 and transitions to an active mode.

At this point, remote TCP module 301 has not received an ACK2 or ACK3. Therefore, the remote TCP module retransmits DATA2 337A to the active/standby network element 302. Since the standby TCP module 312 has transitioned to the active mode, standby TCP module 312 has taken over responsibility for incoming traffic and receives DATA2 337A. The standby TCP module 312 communicates DATA2 337B to the standby APP module 311, which is now in the active mode. The standby APP module 311 recognizes that DATA2 337A was previously received and processed properly so the standby APP module 311 will discard or ignore the data and communicate an APP ACK message (ACK2) 340A to the standby TCP module 312. In response to receiving ACK2 340A, the standby TCP module 312 will communicate ACK2 340B to the remote TCP module 301. Further, the remote TCP module retransmits DATA3 345A to the active/standby network element 302. The standby TCP module 312 receives DATA3 345A and communicates DATA3 345B to the standby APP module 311. The standby APP module 311 processes DATA3 345B and communicates an app ACK message ACK3 350A to the standby TCP module 312. In response to receiving ACK3 350A, the standby TCP module 312 communicates ACK3 350B to the remote TCP module 301.

Figure 4:
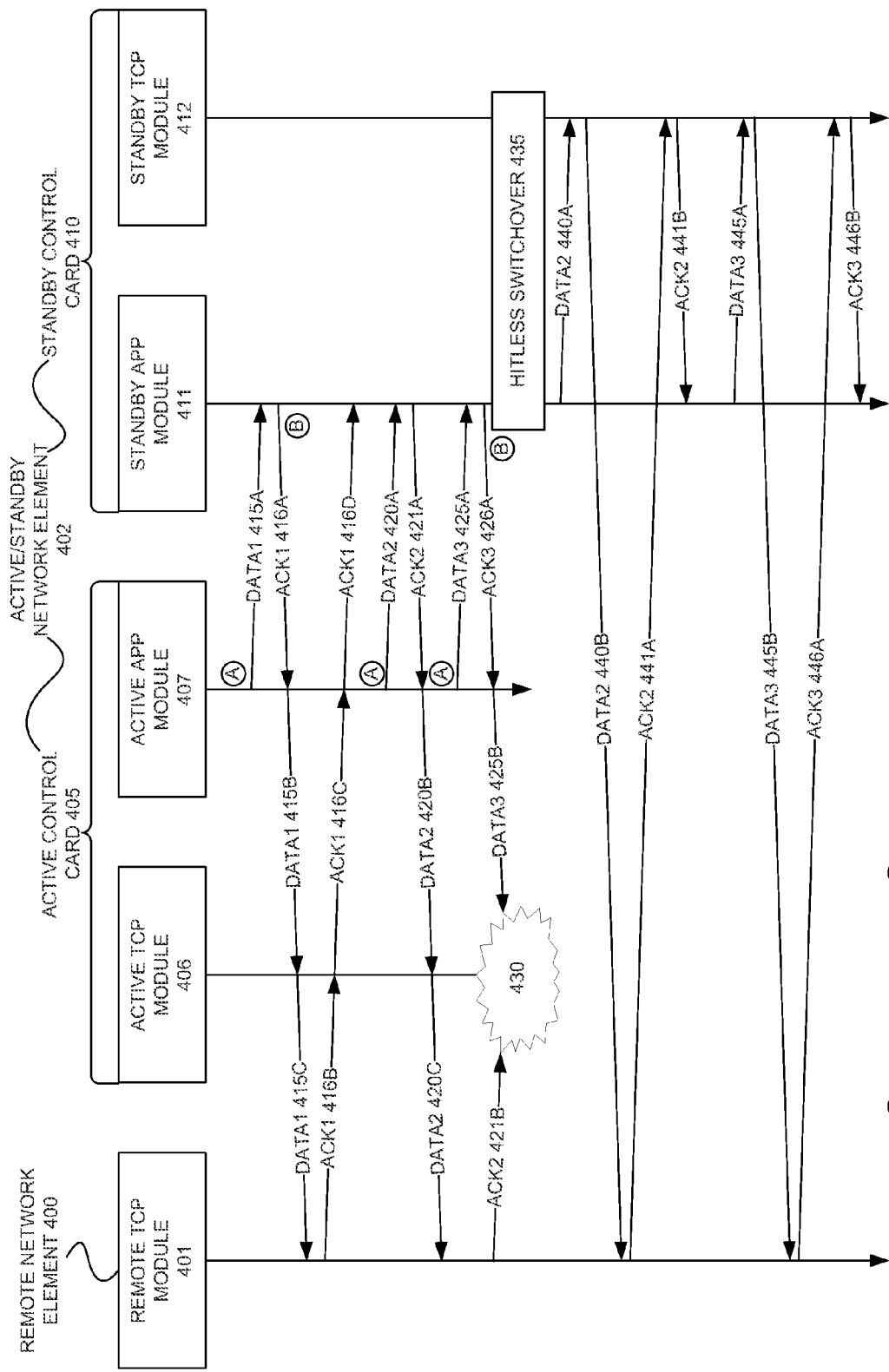
FIG. 4 is a data flow diagram illustrating the path of messages and acknowledgements for data transmitted from a network element to a remote peer according to embodiments of the invention.

FIG. 4 is a data flow diagram illustrating the path of messages and acknowledgements for data transmitted from a network element to a remote peer according to embodiments of the invention. FIG. 4 comprises a remote network element 400 and an active/standby network element 402. The remote network element 400 comprises a remote TCP module 401. The active/standby network element 402 comprises an active control card 405 and a standby control card 410. The active control card 405 comprises an active TCP module 406 and an active APP module 407. The standby control card 410 comprises a standby app module 411 and a standby TCP module 412. Each module is illustrated at the top of FIG. 4 with a vertical line illustrating the passage of time and lines traveling from one vertical line to another to illustrate the transmission of data at a moment of time.

FIG. 4 begins with the active APP module 407 communicates an APP SYNC message DATA1 415A to the standby APP module 411 which responds with an APP SYNC ACK message ACK1 416A. In response to receiving ACK1 416A, the active APP module 407 communicates application data, DATA1 415B to the active TCP module 406 which, in turn, communicates a data packet DATA1 415C to the remote TCP module 401. In response to receiving DATA1 415C, the remote TCP module communicates an ACK message ACK1 416B to the active TCP module 406 which, in turn, communicates an ACK1 416C to the active APP module 407. In response to receiving ACK1 416C, the active APP module 407 communicates ACK1 416D to the standby APP module 411. Thereby, the active APP module 407 and the standby APP module 411 both remove DATA1 from their retransmission lists.

Similarly, the active APP module 407 then communicates an APP SYNC message DATA2 420A to the standby APP module 411 which responds with an APP SYNC ACK message ACK2 421A. In response to receiving ACK2 421A, the active APP module 407 communicates a data packet DATA2 420B to the active TCP module 406 which, in turn, communicates a data packet DATA2 420C to the remote TCP module 401. In response to receiving DATA2 420C, the remote TCP module communicates an ACK message ACK2 421B to the active TCP module 406, however, the active TCP module 406 does not receive ACK2 421B because a switchover event 430 occurs before receipt. After transmitting DATA2 420B to the active TCP module 406, but prior to the degrading event 430, the active APP module 407 communicates an APP SYNC message DATA3 425A to the standby APP module 411, which responds with an APP SYNC ACK message ACK3 426A. In response to receiving ACK3 426A, the active APP module 407 communicates DATA3 425B to the active TCP module 406, but the degrading event 430 occurs prior to receipt. In response to detecting a switchover event, the standby control card 410 performs a hitless switchover 435 and transitions to an active mode.

At this point, standby APP module 411, now in an active mode, has not received ACK2 or ACK3 and will use its retransmission list to determine which packets to resend. The standby APP module 411 will communicate DATA2 440A to the standby TCP module 412, now in an active mode, which will respond by communicating DATA2 440B to the remote TCP module 401. The remote TCP module 401 has already received DATA2 420C and thus DATA 440B is duplicative. The remote TCP module is expected to recognize the duplicated data and send back an ACK message ACK2 441A. The standby TCP module 412 will receive ACK2 441A and communicate ACK2 441B to the standby APP module 411 in response. Further, standby APP module 411 will need to resend DATA3 and will communicate DATA3 445A to the standby TCP module which will respond by communicating DATA3 445B to the remote TCP module 401. The remote TCP module 401 will respond to DATA3 445B by communicating an ACK message ACK3 446A to the standby TCP module 412 which will communicate ACK3 446B to the standby APP module 411 in response. Thereby, standby APP module 411 will remove DATA2 and DATA3 from its retransmission list resending those to the remote TCP module 401.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phasechange memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

Alternative Embodiments

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed in a network element for maintaining an active-standby relationship between an active control card and a standby control card, the method comprising the steps of:
    receiving a data packet from a remote network element at an active transport control protocol ("TCP") module in the active control card;
    communicating at least a portion of the data packet from the active TCP module to an active application ("APP") module in the active control card;
    communicating an APP synchronization ("SYNC") message from the active APP module to a standby APP module on the standby control card responsive to receiving the at least a portion of the data packet;
    receiving a single APP SYNC acknowledgement ("ACK") message from the standby APP module at the active APP module, indicating successful delivery of the APP SYNC message;
    communicating an APP ACK message from the active APP module to the active TCP module responsive to receiving the APP SYNC ACK message; and
    communicating a data ACK message from the active TCP module to the remote network element responsive to receiving the APP ACK message, wherein the data ACK message indicates successful delivery of the data packet, wherein the active APP module comprises an active border gateway protocol ("BGP") process and the standby APP module comprises a standby BGP APP, wherein the data packet comprises a BGP update message and the APP SYNC message comprises data used be the standby BGP APP to synchronize state information with the active BGP APP, and wherein the communicating the APP SYNC message from the active BGP APP to the standby BGP APP comprising:
        reading, at the active BGP APP, one or more BGP route updates contained within the BGP update message;
        discarding, at the active BGP APP, one or more BGP route updates based on one or more policies from a local policy information base;
        determining a set of one or more BGP state changes based on an active BGP APP state, the one or more read BGP route updates, and the one or more discarded BGP route updates; and
        generating the APP SYNC message to comprise the set of BGP state changes.

2. The method of claim 1, further comprising the steps of:
    determining a set of one or more active APP state changes based upon an active APP state and information contained in the at least a portion of the data packet; and
    generating the APP SYNC message to comprise the set of active APP state changes.

3. The method of claim 1, wherein the network element is a broadband remote access server.

4. A first control card to be coupled to a second control card, the first control card to serve as an active control card in an active-standby relationship with the second control card, the first control card comprising:
    an active transport control protocol ("TCP") module to be coupled to one or more line cards, the active TCP module configured to:
        receive a data packet from a remote network element,
        communicate at least a portion of the data packet to an active application ("APP") module,
        receive an APP acknowledgement ("ACK") message, and
        communicate a data ACK message to the remote network element in response to the receipt of the APP ACK message; and
    the active APP module to be coupled to the active TCP module and to be further coupled to a standby APP module on the second control card, the active APP module configured to:
        receive the at least a portion of the data packet from the active TCP module,
        communicate an APP synchronization ("SYNC") message to the standby APP module,
        receive a single APP SYNC ACK message from the standby APP module, indicating successful delivery of the APP SYNC message, and
        communicate an APP ACK message to the active TCP module in response to receipt of the APP SYNC ACK message;
    wherein the active APP module is to comprise an active border gateway protocol ("BGP") process and the standby APP module is to comprise an standby BGP APP, wherein the data packet is to comprise a BGP update message and the APP SYNC message is to comprise data used by the standby BGP APP to synchronize state information with the active BGP APP, and wherein the communication the APP SYNC SyNC message to the standby APP module further comprises the active APP module configured to:
        read one or more BGP route updates contained within the BGP update message,
        discard one or more BGP route updates based on one or more policies from a local policy information base,
        determine a set of one or more BGP state changes based on an active BGP APP state, the one or more read BGP route updates, and the one or more discarded BGP route updates, and generate the APP SYNC message to comprise the set of BGP state changes.

5. The first control card of claim 4, wherein the active APP module is further configured to:
determine a set of one or more active APP state changes based upon an active APP state and information contained in the at least a portion of the data packet; and
generate the APP SYNC message to comprise the set of active APP state changes.

6. The first control card of claim 4, wherein the active APP module is to be coupled to the standby APP module through an inter-process communications channel.

7. A network element comprising:
a plurality of line cards to be coupled to a network;
a first control card coupled to the plurality of line cards, the first control card to serve as an active control card in an active-standby relationship and comprising:
an active transport control protocol ("TCP") module configured to:
receive a data packet from a remote network element through one of the plurality of line cards,
communicate at least a portion of the data packet to an active application ("APP") module,
receive an APP acknowledgement ("ACK") message, and
communicate a data ACK message to the remote network element through one of the plurality of line cards in response to the receipt of the APP ACK message, and
the active APP module to be coupled to the active TCP module and to be further coupled to a standby APP module on a second control card, the active APP module configured to:
receive the at least a portion of the data packet from the active TCP module,
communicate an APP synchronization ("SYNC") message to the standby APP module,
receive a single APP SYNC ACK message from the standby APP module, indicating successful delivery of the APP SYNC message, and
communicate an APP ACK message to the active TCP module in response to receipt of the APP SYNC ACK message;
wherein the active APP module is to comprise an active border gateway protocol ("BGP") process and the standby APP module is to comprise an standby BGP APP, wherein the data packet is to comprise a BGP update message and the APP SYNC message is to comprise data used by the standby BGP APP to synchronize state information with the active BGP APP, and wherein the communication the APP SYNC SyNC message to the standby APP module further comprises the active APP module configured to:
read one or more BGP route updates contained within the BGP update message;
discard one or more BGP route updates based on one or more policies from a local policy information base;
determine a set of one or more BGP state changes based on an active BGP APP state, the one or more read BGP route updates, and the one or more discarded BGP route updates; and
generate the APP SYNC message to comprise the set of BGP state changes; and
the second control card coupled to the plurality of line cards and to the first control card, the second control card to serve as a standby control card in the active-standby relationship with the first control card and comprising:
a standby TCP module to be coupled to a standby APP module, the standby TCP module configured to:
communicate with the plurality of line cards, and
communicate with the standby APP module, and
the standby application module configured to:
receive the APP SYNC message from the active APP module,
transmit the APP SYNC ACK message to the active APP module to indicate receipt of the APP SYNC message.

8. The network element of claim 7, wherein the active APP module is further configured to:
determine a set of active APP state changes based upon an active APP state and information contained in the at least a portion of the data packet; and
generate the APP SYNC message to comprise the set of active APP state changes.

9. The network element of claim 7, wherein the network element is a broadband remote access server.

10. A method performed in a network element for maintaining an active-standby relationship between an active control card and a standby control card, the method comprising the steps of:
communicating an application ("APP") synchronization ("SYNC") message from an active APP module in the active control card to a standby APP module in the standby control card, wherein the APP SYNC message is associated with at least a portion of an APP data packet to be transmitted to a remote network element;
receiving a single APP SYNC acknowledgement ("ACK") message from the standby APP module at the active APP module, indicating successful delivery of the APP SYNC message;
communicating the APP data packet from the active APP module to an active transport control protocol ("TCP") module in the active control card responsive to receiving the APP SYNC ACK message;
communicating the APP data packet from the active TCP module to the remote network element;
adding a first retransmission entry to a first retransmission list associated with the active APP module;
adding a second retransmission entry to a second retransmission list associated with the standby APP module;
receiving a remote ACK message from the remote network element at the active TCP module, wherein the remote ACK message indicates successful delivery of the APP data packet at the remote network element;
communicating at least a portion of the remote ACK message from the active TCP module to the active APP module;
removing the first retransmission entry from the first retransmission list responsive to receiving the remote ACK message at the active APP module;
communicating at least a portion of the remote ACK message from the active APP module to the standby APP module; and
removing the second retransmission entry from the second retransmission list responsive to receiving the remote ACK message at the standby APP module.

11. The method of claim 10, further comprising the step of:
determining a set of one or more active APP state changes associated with an active APP state and information contained in the APP data packet, wherein the APP SYNC message comprises the set of active APP state changes.

12. The method of claim 10, wherein the APP SYNC message is communicated to the standby APP module across an inter-process communications channel.

13. The method of claim 10, wherein the active APP module comprises an active border gateway protocol ("BGP") process and the standby APP module comprises a standby BGP APP, and wherein the data packet comprises a BGP update message and the APP SYNC message comprises data used be the standby BGP APP to synchronize state information with the active BGP APP.

14. The method of claim 13, further comprising the steps of:
- reading, at the active BGP APP, one or more BGP route updates contained within the BGP update message;
- discarding, at the active BGP APP, one or more BGP route updates based on one or more policies from a local policy information base;
- determining a set of one or more BGP state changes based on an active BGP APP state, the one or more read BGP route updates, and the one or more discarded BGP route updates; and
- generating the APP SYNC message to comprise the set of BGP state changes.

* * * * *

UNITED STATES PATENT AND TRADEMARK OFFICE
CERTIFICATE OF CORRECTION

PATENT NO. : 9,013,978 B2  Page 1 of 1
APPLICATION NO. : 14/085050
DATED : April 21, 2015
INVENTOR(S) : Heitz It is certified that error appears in the above-identified patent and that said Letters Patent is hereby corrected as shown below:

On the Title Page, in Figure, in Box "109", Line 5, delete "CAHNGES)" and insert -- CHANGES) --, therefor.

In the drawings

In Fig. 1a, Sheet 1 of 6, in Box "109", Line 5, delete "CAHNGES)" and insert -- CHANGES) --, therefor.

In Fig. 2, Sheet 4 of 6, delete " 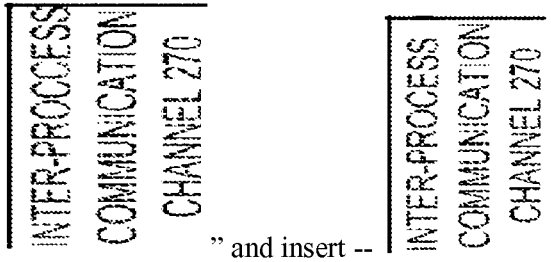 " and insert --  --, therefor.

In the specification

In Column 1, Line 9, delete "2011," and insert -- 2011, now Patent No. 8,614,941, --, therefor.

In the claims

In Column 15, Line 64, in Claim 1, delete "be the" and insert -- by the --, therefor.

In Column 16, Line 57, in Claim 4, delete "SyNC message" and insert -- message --, therefor.

In Column 17, Line 52, in Claim 7, delete "SyNC message" and insert -- message --, therefor.

In Column 19, Line 9, in Claim 13, delete "be the" and insert -- by the --, therefor.

Signed and Sealed this
Sixth Day of October, 2015

Michelle K. Lee
*Director of the United States Patent and Trademark Office*